Nov. 18, 1969  R. E. MALM  3,479,495
SIGNAL CORRELATION SYSTEM USING DELTA MODULATION
Filed June 1, 1966
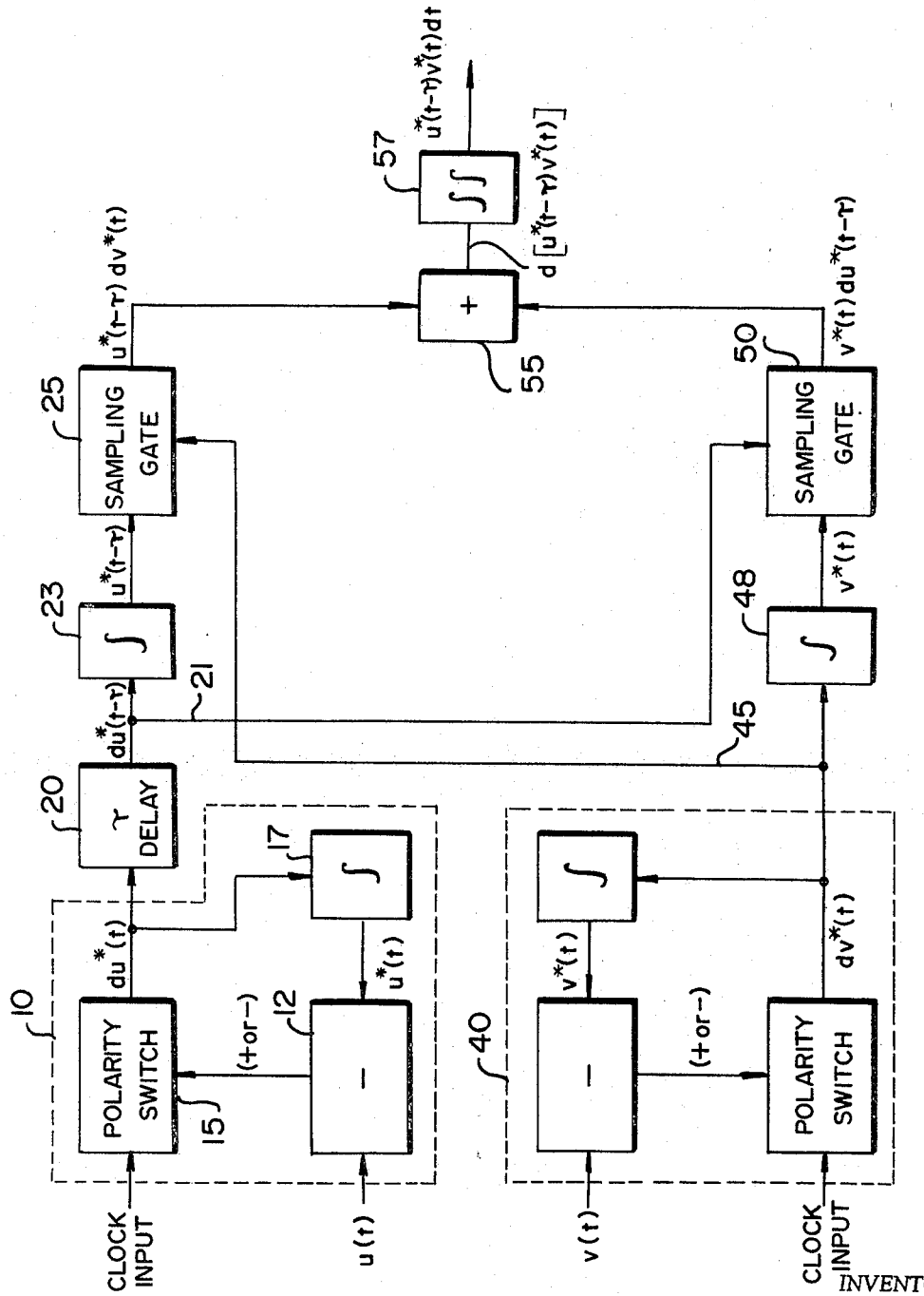
INVENTOR
ROBERT E. MALM
BY Hurvitz & Rose
ATTORNEYS

United States Patent Office 3,479,495
Patented Nov. 18, 1969

3,479,495
SIGNAL CORRELATION SYSTEM USING DELTA MODULATION
Robert E. Malm, Bethesda, Md., assignor to Page Communications Engineers, Inc., Washington, D.C., a corporation of Delaware
Filed June 1, 1966, Ser. No. 554,561
Int. Cl. G06f 15/34; G06g 7/19
U.S. Cl. 235—181                                                6 Claims

ABSTRACT OF THE DISCLOSURE

A signal correlation system includes a pair of signal processing channels, each of which is responsive to a respective incoming time-varying signal for encoding that signal in a pulse format in which successive pulse polarities are representative of the variation of the respective input signal amplitude with time, relative to a reference level. The reference level is not constant, being obtained from a summing unit within the encoder responsive to the pulse format. In one channel the pulse format constituting the encoder output is delayed and then intergrated, while in the other channel it is simply integrated. The integration waveform of each channel is then multiplied by the pulse format entering the integrator of the other channel (delayed in oen channel) and the resulting two product waveforms are added together. The summed product waveforms are subjected to double integration to obtain the correlation function of the input signals.

---

The present invention relates generally to signal correlation systems, and more particularly, to systems for correlating time varying electrical signals by use of delta-modulation signal pre-processing techniques.

According to the invention, the input signal or signals to be correlated are subjected to analog-to-digital preprocessing by delta modulation techniques to produce a stream or streams of constant amplitude positive and negative pulses constituting essentially the differential of a quantized representation of the respective original input signal. The correlation function of the quantized representations is then derived by processing the differential functions so obtained and can be made to approach the correlation function of the original signals to any desired degree of accuracy by appropriate selection of parameter values. This method provides as a principal advantage over prior art methods of signal correlation in general and analog-digital methods of correlation in particular, a substantial reduction in complexity of the circuitry required to effect accurate correlation.

Accordingly, it is a broad object of the present invention to provide improvements in signal correlation systems.

More specifically, it is an object of the invention to provide apparatus for delta modulation correlation of one or more time varying electrical signals.

These and other objects, features and advantages of the present invention will become apparent from the following detailed description of a preferred embodiment thereof, especially when taken in conjunction with the accompanying drawing, in which the sole figure is a circuit diagram of a delta modulation correlation system.

Referring now to the drawing, unit 10 is a delta modulation encoder comprising a differencing circuit (subtractor) 12 to which a time varying signal $u(t)$ under observation is applied; a polarity switch 15 adapted to generate a pulse having a polarity dependent upon the polarity of the output of the differencing circuit at the time of arrival of a clock pulse from any suitable source of timing pulses; and an integrator 17 responsive to the constant amplitude pulses generated by the polarity switch for summation thereof as a second input to subtractor 12.

The combination of differencing circuit 12, polarity switch 15, and integrator 17 is effective to develop a quantized representation $u^*(t)$ of input signal $u(t)$ at the output of the integrator. Subtractor 12 compares the instantaneous amplitudes of the function $u^*(t)$ and the input signal $u(t)$ and supplies an output which is either positive or negative depending respectively upon whether $u(t)$ is greater than or less than $u^*(t)$. Each clock pulse (all of which are of positive polarity) coincident with a positive output from subtractor 12 is passed through the polarity switch with no change in sign, thereby incrementally increasing the output of integrator 17. On the other hand, if the output of the subtractor is negative, indicative of $u(t)$ less than $u^*(t)$, the sign of the clock pulse is changed in passing through the polarity switch and the integrator output is decreased by an increment proportional to the magnitude of the clock pulse. Since the clock pulses are of constant or uniform amplitude and vary in polarity according to the relative magnitudes of $u(t)$ and $u^*(t)$, as determined at regular intervals according to the clock rate, it will be observed that the integrator output tends to track the input signal in uniform discrete steps.

It is to be emphasized that no claim is made for novelty in the structural details of the various components per se of delta modulation encoder 10 nor for any of the remaining individual components of the overall system, each of which may take any of a number of forms well known in the art.

The output of delta modulation encoder or converter 10 is the train of constant amplitude pulses (spaced at regular intervals) emanating from polarity switch 15, each pulse having a polarity dependent upon the relative magnitudes of $u(t)$ and $u^*(t)$, and constitutes the differential function $du^*(t)$ of the function $u^*(t)$. Hence, the successive pulse polarities in the pulse format generated by the delta modulation encoder are representative of the amplitude variations of the input signal with time. The encoder output $du^*(t)$ is delayed by a predetermined interval of time $\tau$, upon passage through delay unit 20, such as a delay line or shift register, to produce a time delayed waveform $du^*(t-\tau)$. The pulses in the time delayed pulse waveform are sequentially summed by integrator 23 to produce a quantized representation of the original input signal delayed by the predetermined time interval (i.e. a waveform $u^*(t-\tau)$ whose amplitude varies in discrete uniform steps in a delayed tracking of the original input signal).

The signal $v(t)$ with which input signal $u(t)$ is to be correlated is processed in a manner identical to that described above in a second signal processing channel, except that the output of the delta modulation encoder of the second channel is not subjected to a time delay. Accordingly, $v(t)$ is applied to delta modulation encoder 40 along with a clock input from the same source of clock pulses as that supplying encoder 10 in order to synchronize the two pulse formats. The output of encoder 40 is the differential $dv^*(t)$ of the function $v^*(t)$ and, like $du^*(t)$, consists of a format of positive and negative pulses of constant amplitude. It should be observed that $v(t)$ may be $u(t)$ if autocorrelation is desired.

The pulses within the pulse format generated by delta modulation encoder 40 are sequentially summed by integrator 48 to produce a waveform $v^*(t)$ having an amplitude that varies in discrete uniform steps approximating the amplitude variations of input signal $v(t)$. Each of the quantization waveforms generated by the integrators 23, 48 is fed to a respcetive sampling gate 25, 50, also arranged to receive the pulse format carried by the other channel via respective conductive paths 21 and 45. In this respect, it will be observed from the figure that sampling gate 25 in the first channel has a pair of input paths, one of which is connected to the output path of integrator 23 and the other of which (i.e. the gate path) is connected to the output path of encoder 40. Similarly, sampling gate 50 in the second channel has a pair of input paths, one of which is connected to the output path of integrator 48 and the other of which (i.e. the gate path) is connected to the output path of delay unit 20.

Each sampling gate is arranged and adapted to sample the waveform arriving from the respective integrator in response to the pulses received from the other channel, and to reverse the polarity of the sample when the received pulse is of negative polarity. That is, if a positive pulse is applied to the gate, a sample of the respective quantization waveform is passed without change in polarity; while the application of a negative pulse to the gate path of the sampling gate causes the gate to invert (i.e. reverse the polarity of) the concurrent sample. Since each of the pulse formats contains constant amplitude pulses spaced at regular intervals and each of the quantization waveforms is characterized by amplitude variations in discrete uniform steps or increments corresponding to the pulse height, the effect of the sampling gate operation is a multiplication of the quantization waveform and pulse format applied thereto. In other words, each sample is multiplied by a unit value (the uniform pulse height) of either positive or negative sign (the pulse polarity).

The output of sampling gate 25 is therefore the product waveform $u^*(t-\tau)dv^*(t)$ consisting of a sequence of pulses (samples) each having an amplitude which is an integral multiple of the amplitude of the clock pulses and a polarity governed by the polarity of the respective pulse in the format $dv^*(t)$. A similar analysis is applicable to the samples emanating from gate 50 in waveform $v^*(t)du^*(t-\tau)$.

The outputs of sampling gates 25 and 50 are combined in adder 55 to form still another pulse train constituting the differential of $u^*(-\tau)v^*(t)$. That is, $$u^*(t-\tau)dv^*(t)+v^*(t)du^*(t-\tau)=d[u^*(t-\tau)v^*(t)]$$

which is the summing operation performed by adder 55. When subjected to double integration by unit 57, the adder output is converted to the correlation function $\int u^*(t-\tau)vo(t)dt$ which can be made to approach the correlation function $\int u(t-\tau)v(t)dt$ to any desired degree of accuracy by appropriate selection of parameter values such as clock pulse amplitude and spacing.

While I have described and illustrated on specific embodiment of my invention, it will be clear that variations of the details of construction which are specifically illustrated and described may be resorted to without departing from the true spirit and scope of the invention.

I claim:

1. Apparatus for deriving the correlation function of first and second input signals having respective amplitudes that vary with time, said apparatus comprising
   a first channel responsive to said first signal for developing a signal format from which said correlation function may be derived,
   a second channel responsive to said second signal for developing a signal format from which said correlation function may be derived,
   said first channel including
      means responsive to said first signal for conversion thereof to a stream of uniformly spaced constant amplitude pulses of varying polarity, in which the successive pulse polarities are respectively representative of the amplitude variations of said first signal with time relative to a reference level,
      means responsive to said stream of pulses for introducing a predetermined uniform time delay therein, and
      means responsive to the time delayed stream of pulses for integration thereof with respect to time;
   said second channel including
      means responsive to said second signal for conversion thereof to a stream of uniformly spaced constant amplitude pulses of varying polarity, in which the successive pulse polarities are respectively representative of the amplitude variations of said second signal with time relative to said reference level, and
      means responsive to the stream of pulses derived from said second signal for integration thereof with respect to time;
   clock pulse means coupled to said conversion means of both of said first said and second channels for synchronizing the conversion of said first and second signals;
   said first channel further including means responsive to the output signal of said integration means of said first channel and to the output stream of pulses of said conversion means of said second channel for multiplication thereof;
   said second channel further including means responsive to the output signal of said integration means of said second channel and to said time delayed stream of pulses of said first channel for multiplication thereof;
   means responsive to the respective product signals of said multiplication means of said first channel and of said multiplication means of said second channel for adding the two product signals together; and
   means responsive to the output signal of said adding means for performing a double integration of the summed product signals to provide a correlation of said first and second input signals.

2. The combination according to claim 1 wherein said first and second input signals are identical.

3. The combination according to claim 1 wherein said conversion means of each of said first and second channels comprises a delta modulation encoder; said encoder including:
   switching means having a pair of input paths and an output path,
   means for applying the clock pulses of said clock pulse means to one of said input paths of said switching means,
   an integrator coupled to the output path of said switching means,
   a subtractor having a pair of input paths and an output path,
   means for applying a respective one of said first and second input signals to one of the input paths of said subtractor and means connecting the output of said integrator to the other of said subtractor input paths, and
   means connecting the subtractor output path to the other of said input paths of said switching means;
   said switching means supplying clock pulses to its output path from the input path to which said clock pulses are applied, with a polarity dependent upon the instantaneous polarity of the subtractor output signal coincident with each applied clock pulse.

4. A signal correlator, comprising
   a pair of signal processing channels, each of said channels including
      means for encoding input signal having an amplitude that varies with time into a pulse format wherein the polarity of each pulse is indicative of the variation of said signal amplitude with time relative to a reference level,
      means responsive to the pulses in said format for integrating the pulses in said format over a time interval equal to the time interval occupied by said format to produce a waveform having discrete amplitude variation constituting a quantized representation of said input signal, and means responsive to the waveform produced by said integrating means, and to the pulse format produced by the encoding means in the other channel, for multiplying said waveform by the pulse format of said other channel;

means for synchronizing the operation of the encoding means of each of said channels by application of common clock pulses thereto;

one of said channels further including means connected to receive the pulses in the format produced by the encoding means of that channel for time displacement relative to the reference time with which the pulse format of each channel is initially synchronized, and for supplying the time displaced format to the integrating means of that channel and to the multiplying means of the other channel;

means responsive to the product waveforms produced by the multiplying means of both channels for adding them together; and means responsive to the added product for developing a correlation between the input signals of said pair of channels by double integration of said added product signals with respect to time.

5. The combination according to claim 4 wherein said means for multiplying comprises a gating circuit for sampling the waveform generated by said summing means upon receipt of each successive pulse within the pulse format carried by the other channel and for reversing the polarity of the sample obtained when the received pulse is of negative polarity.

6. The combination according to claim 4 wherein said encoding means of each channel includes switch means responsive to said clock pulses for passage thereof with a polarity dependent on the polarity of a further signal applied thereto, means responsive to the clock pulses passed by each switch means for integration thereof over a corresponding period of time, and means responsive to the output signal of the last-named integration means and to the input signal of the respective channel for subtraction thereof and for supplying a signal representative of the polarity of the difference as said further signal to said switch means.

References Cited

UNITED STATES PATENTS 3,289,154  11/1966  Cunningham _____ 340—15.5

MALCOLM A. MORRISON, Primary Examiner

F. D. GRUBER, Assistant Examiner

U.S. Cl. X.R.

235—183, 196; 324—77